United States Patent [19]

Pinson

[11] Patent Number: 4,988,858
[45] Date of Patent: Jan. 29, 1991

[54] CATOPTRIC MULTISPECTRAL BAND IMAGING AND DETECTING DEVICE

[75] Inventor: George T. Pinson, Huntsville, Ala.

[73] Assignee: The Boeing Company, Seattle, Wash.

[21] Appl. No.: 372,772

[22] Filed: Jun. 29, 1989

Related U.S. Application Data

[63] Continuation-in-part of Ser. No. 929,356, Nov. 12, 1986, Pat. No. 4,812,030, which is a continuation-in-part of Ser. No. 688,535, Jan. 3, 1985, abandoned.

[51] Int. Cl.$^5$ .......................... G01J 3/50; G02B 5/10
[52] U.S. Cl. ................................ 250/208.1; 250/226; 250/339; 250/347; 350/624
[58] Field of Search ............... 250/226, 203.3, 203.2, 250/203.1, 201.1, 201.2, 201.3, 339, 347, 203.6, 208.1; 356/141, 51, 319, 320, 222, 224, 152; 350/620, 622, 624, 623, 619, 505

[56] References Cited

U.S. PATENT DOCUMENTS

| | | | |
|---|---|---|---|
| 3,402,634 | 9/1968 | Bennett | 356/323 |
| 3,662,171 | 5/1972 | Brengman et al. | 250/83.3 H |
| 3,665,196 | 5/1972 | Macall | 250/211 J |
| 3,714,435 | 1/1973 | Bestenreiner et al. | 250/83.3 H |
| 3,748,471 | 7/1973 | Ross et al. | 250/333 |
| 3,887,263 | 6/1975 | Thompson, III | 350/620 |
| 3,944,167 | 3/1976 | Figler et al. | 244/3.16 |
| 3,962,578 | 6/1976 | Roschen | 250/226 |
| 4,101,767 | 7/1978 | Lennington et al. | 250/339 |
| 4,107,530 | 8/1978 | Brumfield et al. | 250/342 |
| 4,206,354 | 6/1980 | Small, Jr. | 250/349 |
| 4,423,325 | 12/1983 | Foss | 250/332 |
| 4,528,449 | 7/1985 | Gordon et al. | 250/352 |
| 4,576,452 | 3/1986 | Abel et al. | 350/620 |
| 4,836,666 | 6/1989 | Meinel et al. | 350/620 |

FOREIGN PATENT DOCUMENTS 59-182346(A) 3/1983 Japan.

OTHER PUBLICATIONS

Willard et al., *Instrumental Methods of Analysis*, 5th ed., 1974, p. 72.
Silverberg et al., "A 1.2 Meter Balloon-Borne Telescope for a Submillimeter Wave Sky Survey", SPIE vol. 172, Instr. in Astron. III, 1979, pp. 149-154.
*Shimadzu Spectrophotomer*, (American Instrument Co., Inc.), 1968, pp. 1-13.

*Primary Examiner*—David C. Nelms
*Assistant Examiner*—Michael Messinger
*Attorney, Agent, or Firm*—Finnegan, Henderson Farabow, Garrett & Dunner

[57] ABSTRACT

A multispectral band imaging and detecting device for use with a catoptric zoom optical device having a focal plane. A plurality of electromagnetic radiation detectors are provided that are sensitive to one or more portions of the electromagnetic spectrum. An optical bench has the plurality of electromagnetic radiation detectors disposed thereon. A torque motor or the like is operatively connected to move the optical bench relative to the focal plane to move a selected one of the detectors into coincidence with the focal plane.

24 Claims, 11 Drawing Sheets

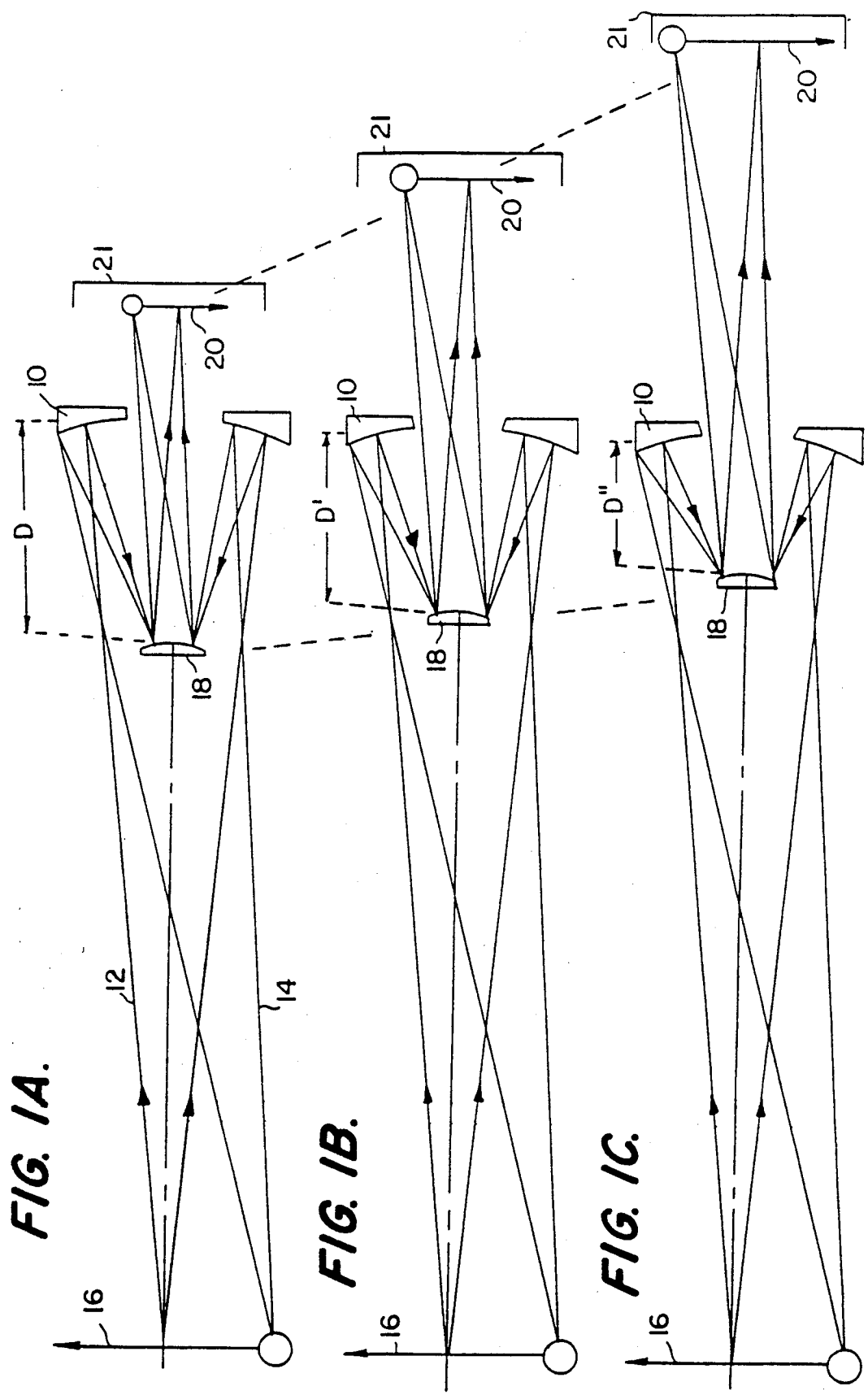

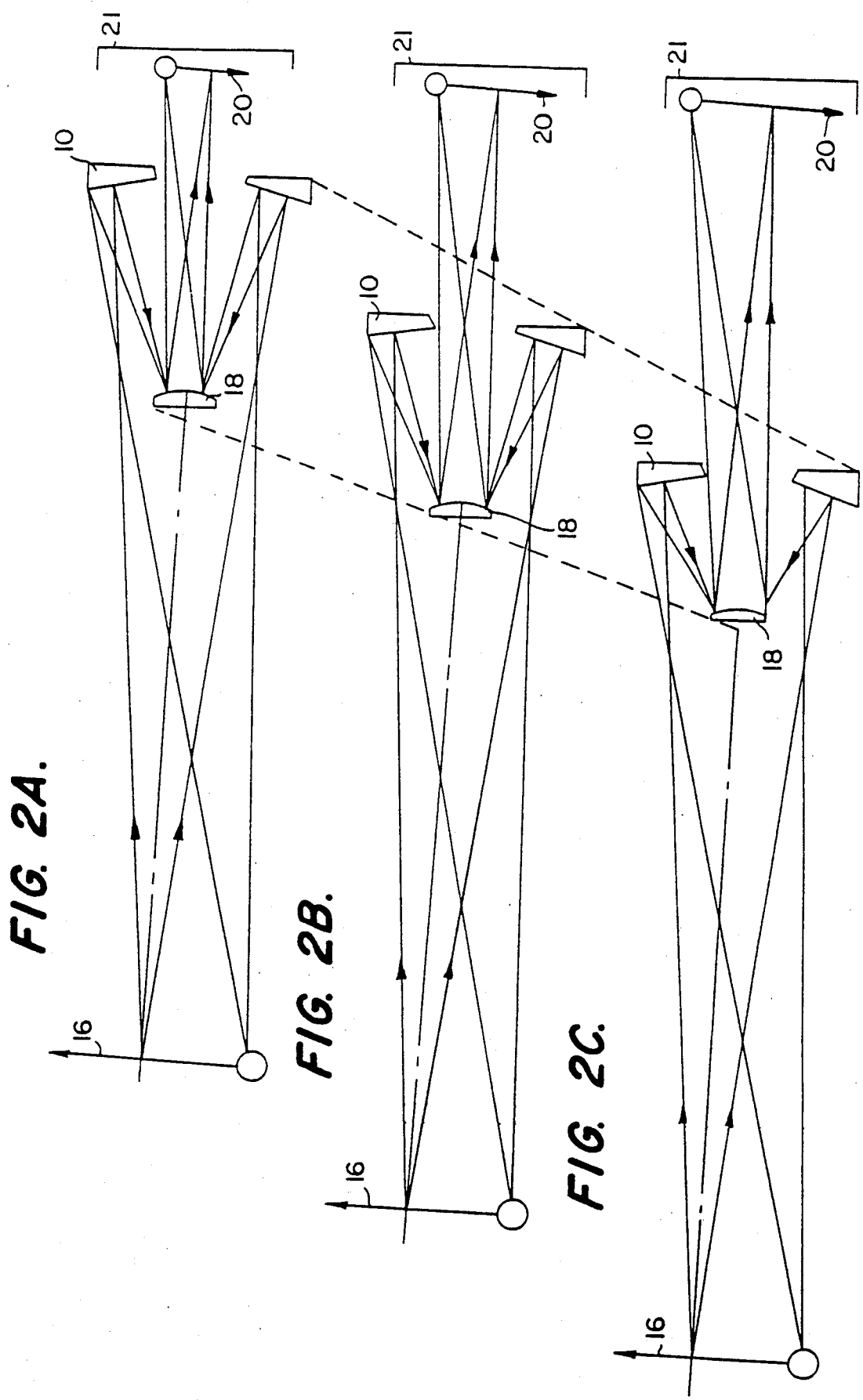

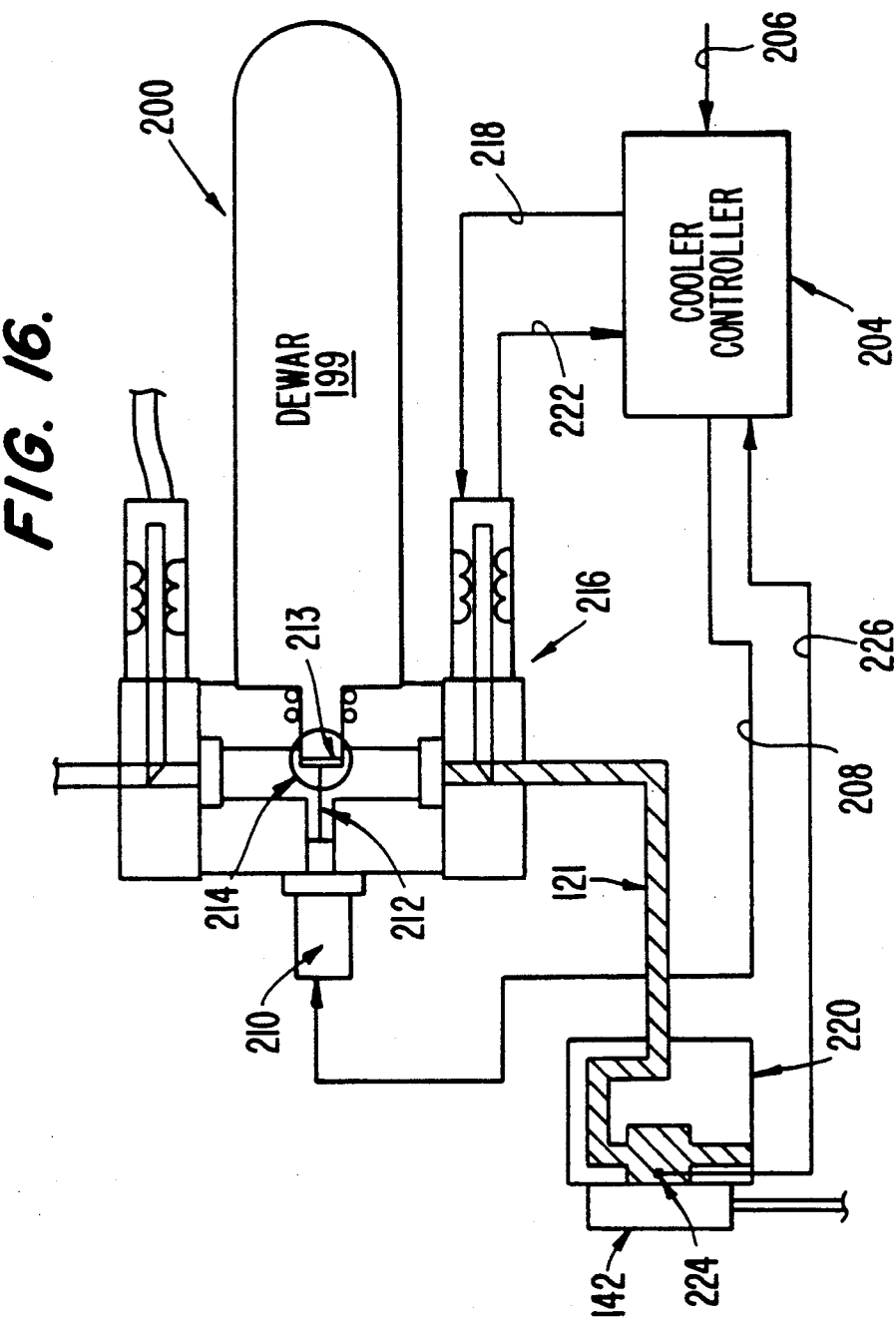

CATOPTRIC MULTISPECTRAL BAND IMAGING AND DETECTING DEVICE

RELATED APPLICATIONS

This application is a continuation-in-part of U.S. patent application Ser. No 929,356 filed on Nov. 12, 1986, now U.S. Pat. No. 4,812,030, which, in turn, is a continuation-in-part of the inventor's application Ser. No. 06/688,535, filed Jan. 3, 1985, now abandoned.

BACKGROUND OF THE INVENTION

1. Field of the Invention

This invention relates to a device for detecting an image. More particularly, the invention relates to a catoptric optical apparatus for forming and detecting an image of an object emitting electromagnetic energy in wavelengths from ultraviolet through infrared.

2. Description of the Related Art

Heretofore, zoom optical devices have used multiple refractive lenses or a combination of refractive lenses and reflective elements to achieve selectively magnified images while correcting for chromatic and monochromatic aberrations. Use of refractive lenses in such devices reduces the amount of energy that reaches a detector element and introduces chromatic aberrations. In addition, each lens results in energy intensity losses because of surface reflections and because of absorption as the energy travels through the lens material. These losses are typically substantial.

The prior art zoom optics generally work very well in energy frequency bands in which the selected lens materials are transmissive, but these zoom optical devices suffer from the disadvantage of being heavy and bulky. In addition, these devices generally require large lens diameters to increase the amount of energy focused on the detector while compensating for reflection and absorption losses.

In the long infrared wavelength spectrum, lens materials, such as flint glass, are not transparent. Thus, to obtain a refractive system sensitive to infrared energy, lenses made of exotic materials, such as silicon, germanium or sodium chloride, must be used. These materials are somewhat transparent at infrared wavelengths, but reflective losses still occur at each lens surface and absorption losses occur as the energy travels through the lens material. Moreover, infrared optical systems are expensive to manufacture, are delicate and may require special protection when they are used in different environments.

Refractive zoom optical systems are used to provide a change in the field of view and correspondingly a change in the magnification of an image. Since the focal point for two different wavelengths of light is different for a given refractive design, careful attention must be paid to the selection of lens materials and to the figure of the various lenses to reduce chromatic aberration to an acceptable level. In addition to chromatic aberration, as the wavelength of the radiation varies, e.g., as the wavelength shortens to ultraviolet and beyond or lengthens to infrared on the other end of the spectrum, energy attenuation as the incoming radiation passes through lens elements becomes important. It is, in general, not possible with currently known lens materials to use a single lens material in ultraviolet, visible and infrared parts of the spectrum.

A reflective device provides two major advantages over refractive designs. First, reflective elements are free of chromatic aberration. This permits all wavelengths from ultraviolet to infrared to be focused at the same point. Secondly, although the reflectivity of mirror coatings may change with wavelength, a mirror is not subject to absorptivity since the electromagnetic energy does not pass through the material.

Wavelength not only affects the optical characteristics of refractive elements but also affects a detector's response. Accordingly, if different portions of the electromagnetic spectrum emanating from a scene being viewed are to be viewed or detected, it is necessary to move detectors having differing wavelength response characteristics into and out of the image formed by the optical system.

It is an object of the present invention to provide an optical system capable of detecting any portion of the electromagnetic spectrum emanating from a scene being viewed.

It is a further object of the present invention to provide such an optical system wherein a desired one of a plurality of detectors can be moved into the image formed by an optical system.

A still further object is to provide a zoom optical device capable of selectively magnifying and detecting the image of an object emitting electromagnetic energy in wavelengths from ultraviolet through infrared without the many disadvantages in cost and construction of the prior art devices.

It is a still further object of the present invention to provide a multispectral band detector with common optics of low cost and complexity wherein absorption losses and chromatic aberration are minimized or eliminated.

Additional objects and advantages of the invention will be set forth in part in the description which follows, and in part will be obvious from the description or may be learned by practice of the invention. The objects and advantages of the invention may be realized and attained by means of the instrumentalities and combinations, particularity pointed out in the appended claims.

SUMMARY OF THE INVENTION

The catoptric optical device of the invention comprises reflector set means for transforming received object energy into a real image of the object, the reflector set means including a plurality of axially-spaced reflector means for coaxially receiving and reflecting the object energy. The device of the invention further comprises detecting means including a plurality of individual detectors, focusing means for selecting the axial distance between the reflector set means and a focal plane for the image, and means for positioning a selected one of said plurality of detectors in the image formed by the reflector set means.

Preferably, the magnifying means comprises means for selectively varying the relative axial spacing between the reflector means.

In the preferred embodiments, the focusing means comprises means for axially moving the reflector set means relative to the detector into the focal plane, and in the alternative, the focusing means comprise means for axially moving the detector in the focal plane relative to the reflector set means. In the preferred embodiments means are provided for positioning a selected one of a plurality of detectors, each capable of detecting different selected wavelengths, into the focal plane.

The invention also preferably includes means responsive to a selected level of magnification for controlling the magnifying and focusing means.

The invention also contemplates a catoptric optical device comprising a casing, a plurality of axially-spaced reflective surfaces coaxially disposed in the casing for receiving object energy and for forming a real image of the object, means in the casing for axially moving each of the reflective surfaces, means controlling the moving means for selectively changing the axial spacing between the reflective surfaces to generate selectively variable magnification of the image, an optical bench having a face movable transverse to the axially-spaced reflective surfaces, a plurality of spaced electromagnetic radiation detectors mounted on the face of the optical bench, means for moving the optical bench for positioning one of the detectors in axial alignment with the plurality of axially-spaced reflective surfaces, and means controlling the moving means for selectively axially displacing the reflective surfaces in fixed relative relation to focus the image proximate the outlet opening.

In one embodiment, the casing includes means for guidably supporting each reflective surface and reversable motor means drivingly engaging each reflective surface for axially moving it along the supporting means.

Preferably, the changing and displacing means includes microprocessor means for determining the appropriate axial position of the reflective surfaces to generate a focused image of desired magnification.

The accompanying drawings which are incorporated in and constitute a part of this specification, illustrate one embodiment of this invention and, together with the description, serve to explain the principles of the invention.

BRIEF DESCRIPTION OF THE DRAWINGS

FIGS. 1A, 1B and 1C are schematic representations of one embodiment of the reflector set of the invention in different operative relationships.

FIGS. 2A, 2B and 2C are schematic representations of a second embodiment of a reflector set of the invention in different operative relationships.

FIG. 16 is a schematic block diagram of the cooling means of the system of FIG. 9.

DETAILED DESCRIPTION OF THE PREFERRED EMBODIMENTS

Figure 3A:
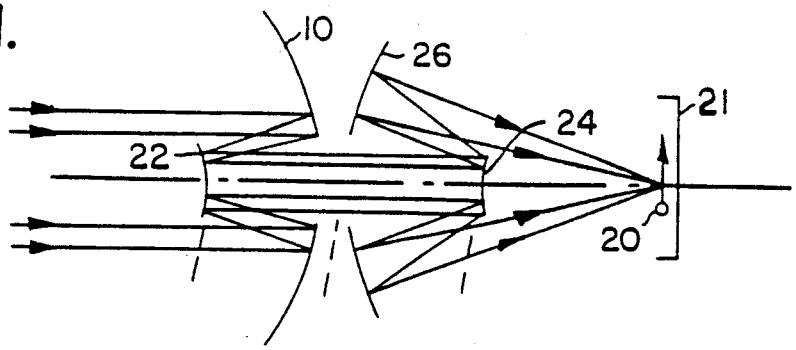
FIGS. 3A, 3B and 3C are schematic representations of a third embodiment of a reflector set of the invention in different operative relationships.

Reference will now be made in detail to the present preferred embodiments of the invention, examples of which are illustrated in the accompanying drawings.

As used herein, the term "catoptric" refers to a device incorporating only reflective elements and not including any refractive element. The term "optical", as used herein, is intended to encompass energy having wavelengths from ultraviolet through infrared. The term "real image" is used in its traditional sense, i.e., the image is real if the rays emerging from the optical system form a beam that converges toward the image. The terms "magnifying" and "magnification", as used herein, are intended to encompass both increasing and decreasing the size of an image. The term "detectors", as used herein means any suitable sensor sensitive to electromagnetic radiation such as, for example, a silicon device, bolometers, thermocouples, vidicons, orthocons, focal plane arrays and infrared and ultrviolet detection devices of a "hot" spot or imaging nature.

In accordance with the invention, the catoptric zoom optical device comprises reflector set means for transforming received object energy into a real image of said object, said set means including a plurality of axially-spaced reflector means for coaxially receiving and reflecting the energy.

As embodied herein and depicted in FIG. 1A, the reflector set means comprises primary reflector 10 disposed to receive energy, represented as rays 12, 14, from object 16 and to reflect that energy to axially-spaced secondary reflector 18 which is disposed to reflect the energy to generate image 20 of object 16.

Primary and secondary reflectors 10, 18 are depicted as spherical reflective surfaces arranged in a simple Cassegrain optical arrangement. It must be understood that the principles of the invention will apply to reflective sets of non-spherical surfaces or combinations of spherical and non-spherical surfaces in Cassegrain, Newtonian, Gregorian and Schwarzschild optical arrangements. The optical characteristics of such surfaces and arrangements are known and may be selected by one skilled in the art for use in the invention.

The invention is applicable to optical systems using a plurality of reflective surfaces which means any number of two or more reflections or reflectors. The embodiments in FIGS. 1 and 2 depict two reflectors 10, 18 providing two reflections. While all embodiments of the invention will incorporate a primary reflector 10 receiving and reflecting the object energy, a plurality of axially-spaced coaxial secondary reflectors receiving and reflecting in series the energy reflected from the primary reflector 10 may be used in the invention.

Figure 3B:
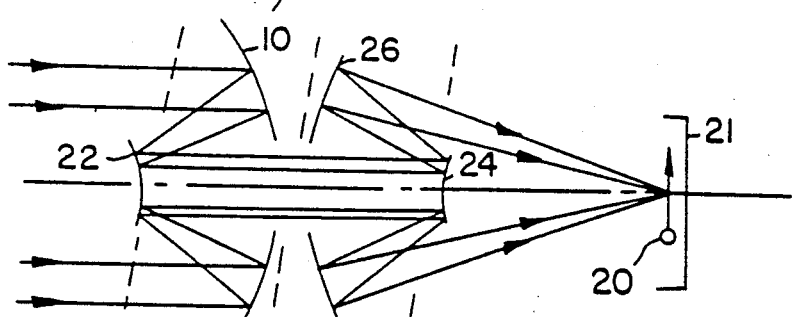
Figure 3C:
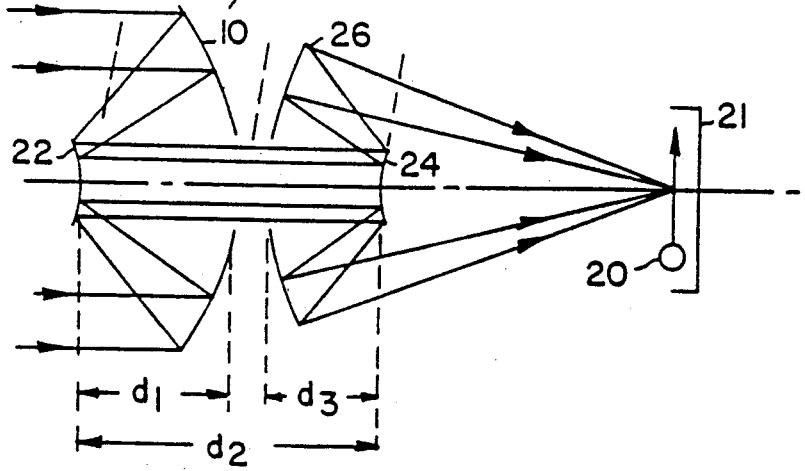

Thus, as seen in FIG. 3, primary reflector 10 reflects object energy to three secondary reflectors 22, 24, and 26, providing four separate reflections.

Figure 4:
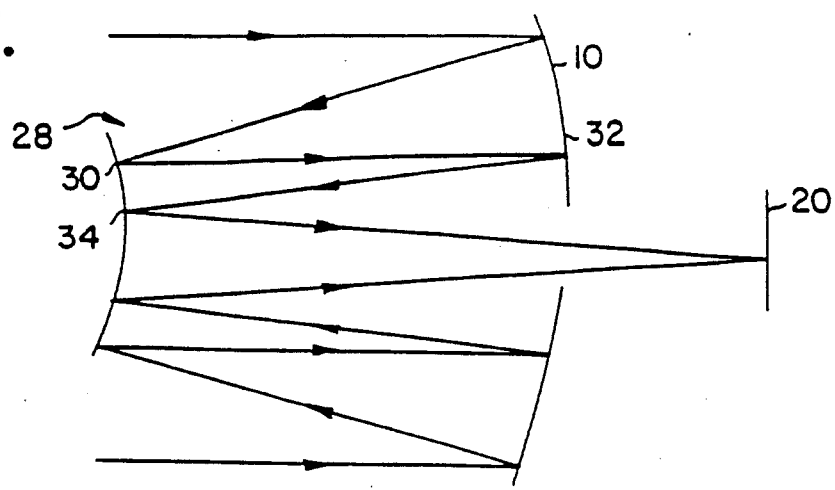

Alternatively, the embodiment depicted in FIG. 4 incorporates two reflectors providing four reflections. The primary reflector 10 reflects energy to secondary reflector 28. Portion 30 of secondary reflector 28 reflects the energy to portion 32 of primary reflector 10 which reflects the energy back to portion 34 of secondary reflector 28 from which image 20 is generated.

Figure 5:
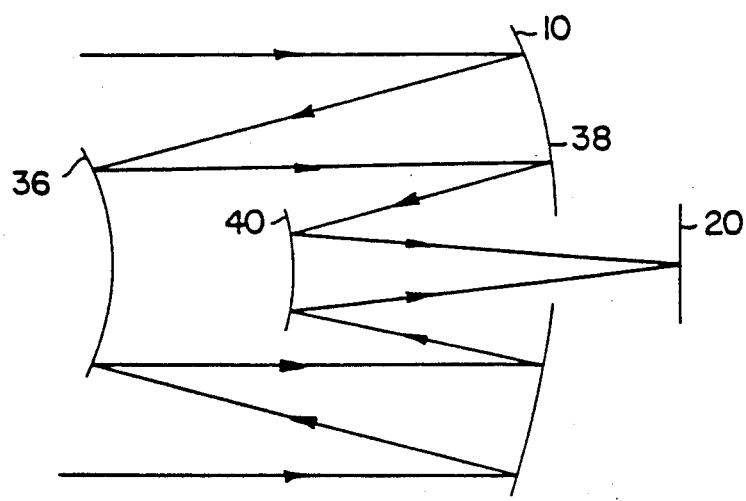
Figure 6:
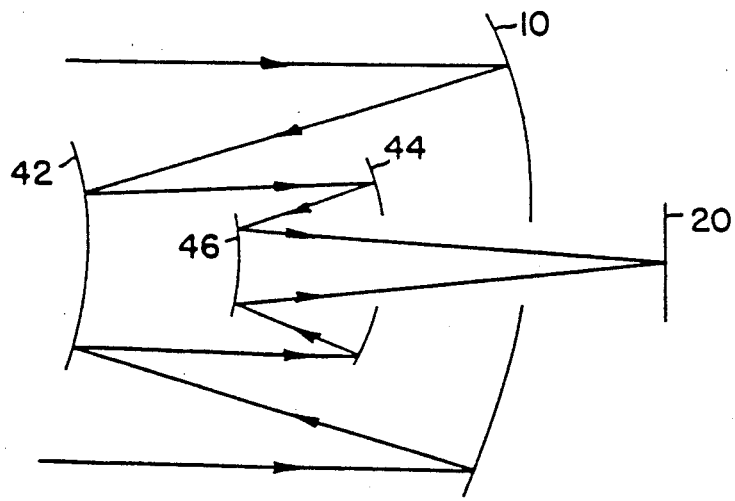

In an alternative arrangement depicted in FIG. 5, primary reflector 10 reflects object energy for reflection in series from first reflector 36, portion 38 of primary reflector 10 and third reflector 40. In the embodiment depicted in FIG. 6, primary reflector means 10 reflects object energy for reflection in series from first reflector 42, second reflector 44 and third reflector 46. In this embodiment, the first, second and third reflectors are each separate reflecting elements.

Figure 7:
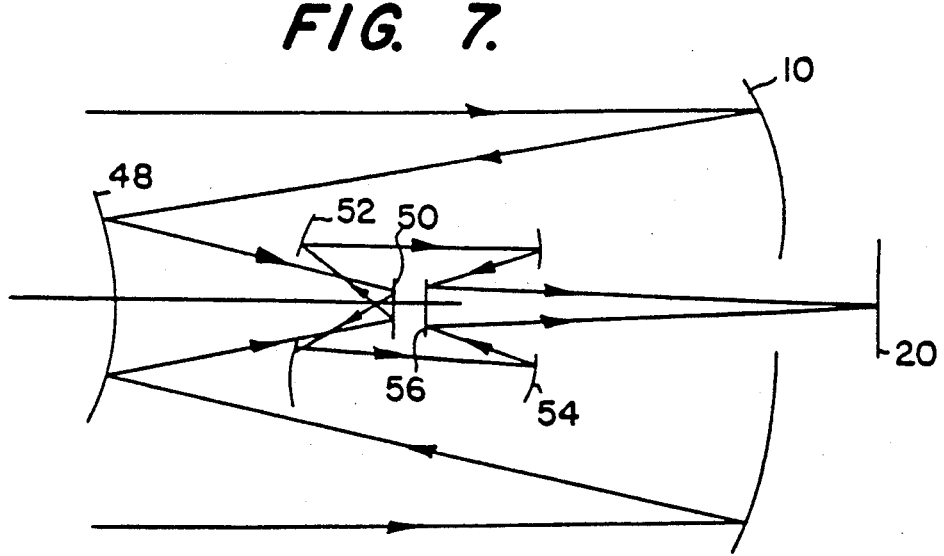
FIGS. 4, 5, 6 and 7 are schematic representations of still other embodiments of the reflector set of the invention.

Finally, in the embodiment depicted in FIG. 7, primary reflector 10 reflects object energy for reflection in series from first reflector 48, second reflector 50, third reflector 52, fourth reflector 54, and fifth reflector 56. This embodiment incorporates six separate reflectors to generate image 20.

It should be understood that the reflector arrangements depicted in FIGS. 1-7 do not represent the only possible arrangements of reflector elements and reflective surfaces. As apparent to one skilled in the field, increasing the number of reflections effectively increases the focal length of the system without increasing its physical length.

The focal length of a reflective system or set is a function of the focal lengths of the individual reflectors and the distances between the reflectors. The focal length F for a two-reflector Cassegrain arrangement as depicted in FIG. 1A is defined as $$F = \frac{f_1 f_2}{f_1 + f_2 - D} \quad (1)$$

where:
$f_1$ is the focal length of primary reflector 10,
$f_2$ is the focal length of secondary reflector 18,
D is the air space or axial space between the reflectors, and
F is the equivalent focal length of the reflector system or set.

As the number of reflectors or reflections is increased, the equivalent focal length equation increases in complexity but the principle remains the same. The focal length of the reflector system or set depicted in FIG. 3 is represented by the relationship $$F = \frac{\left(\frac{f_1 f_2}{f_1 + f_2 - d_1}\right)\left(\frac{f_3 f_4}{f_3 + f_4 - d_3}\right)}{\frac{f_2(f_1 - d_1)}{f_1 + f_2 - d_1} + \frac{f_3(f_4 - d_3)}{f_3 + f_4 - d_3} - d_2} \quad (2)$$

where the individual focal lengths $f_1$, $f_2$, $f_3$ and $f_4$ are the paraxial focal lengths of the individual reflectors 10, 22, 24 and 26, respectively and $d_1$, $d_2$ and $d_3$ are the axial distances between cooperating pairs of reflectors.

The magnification M of a reflective system is defined as the ratio of the lengths α of the images between two different zoom positions. Thus, $$\alpha_1 \cong \frac{h_1}{2f_1}$$

and $$\alpha_2 \cong \frac{h_2}{2f_2}$$

and magnification is:

$$M = \frac{\alpha_1}{\alpha_2}$$

Since a detector size is constant, the height of the two images is necessarily the same. Thus, where $h_1 = h_2$:

$$M = \left(\frac{f_2}{f_1}\right) \quad (3)$$

where $f_1$ and $f_2$ are the focal lengths of the reflector set at the two zoom positions.

The catoptric zoom optical device of the invention preferably further comprises magnifying means for selectively varying the focal length of the reflector set means and focusing means for selectively varying the axial distance between the reflector set means and one of a plurality of detectors of the detection means.

Referring to FIGS. 1A, 1B and 1C, it may be seen that axially moving secondary reflector 18 relative to primary reflector 10 changes the focal length of the reflector set and magnifies image 20. Specifically, the distance D between reflectors 10, 18 in FIG. 1A is reduced to D' and further reduced to D" in FIGS. 1B and 1C, respectively. Combining equations (1) and (3) demonstrates that reducing distance D results in a magnified image 20.

For a detector to receive image 20 in focus it is necessary to adjust the axial distance between the reflector set and the detector. Thus, in the embodiment of FIGS. 1A, 1B, and 1C, a detector means 21 must axially move relative to fixed primary reflector 10 to properly receive in focus magnified image 20.

FIGS. 2A, 2B and 2C represent an alternative arrangement of the embodiment of FIG. 1. In FIG. 2, secondary reflector 18 is axially moved relative to primary reflector 10 resulting in magnification of image 20 in the same manner as in FIG. 1A, 1B and 1C. In the embodiment of FIG. 2, however, the reflector set is axially moved relative to detector means 21 which is fixed. Thus, magnified image 20 is focused on the fixed detector. In FIGS. 2A, 2B, and 2C, the location of object 16 is depicted as axially moving, but this is only for drawing convenience. Object 16 is normally at infinity. As is well known, optical systems are reversible. Accordingly, the reflector set means in accordance with the present invention may be operated in a telescope mode, as depicted in FIG. 2, or, alternatively, the reflector set means may be reversed to operate in a micro mode. In the latter, or micro, mode of operation, secondary reflector 18 becomes the primary reflector and is on the image side of the reflector set means while primary reflector 10 becomes the secondary reflector and is on the object side of the reflector set means.

FIG. 3 depicts a four reflector system the effective focal length of which may be determined by use of equation (2). Magnification of image 20 is achieved by axially moving reflectors 22 and 26 relative to each other and to reflectors 10 and 24. Focusing of magnified image 20 is achieved by axially moving the entire reflector set relative to detector means 21 while maintaining the desired axial spacing between the reflectors 10, 22, 24 and 26.

One skilled in the art is fully capable of determining the changes in magnification of an image resulting from changes in axial spacing between reflectors of a set when the characteristics of the individual reflectors are known. It is within the skill in the art to employ various types of reflectors in various combinations and to determine the magnification effect of relative axial movement of the reflectors and the focusing effect of relative axial movement of the reflector set and the detector. The invention lies in application of these principles in a novel device which provides convenient magnification of a real image of an object generating energy in the ultraviolet through infrared ranges in a selected focal plane.

Figure 8:
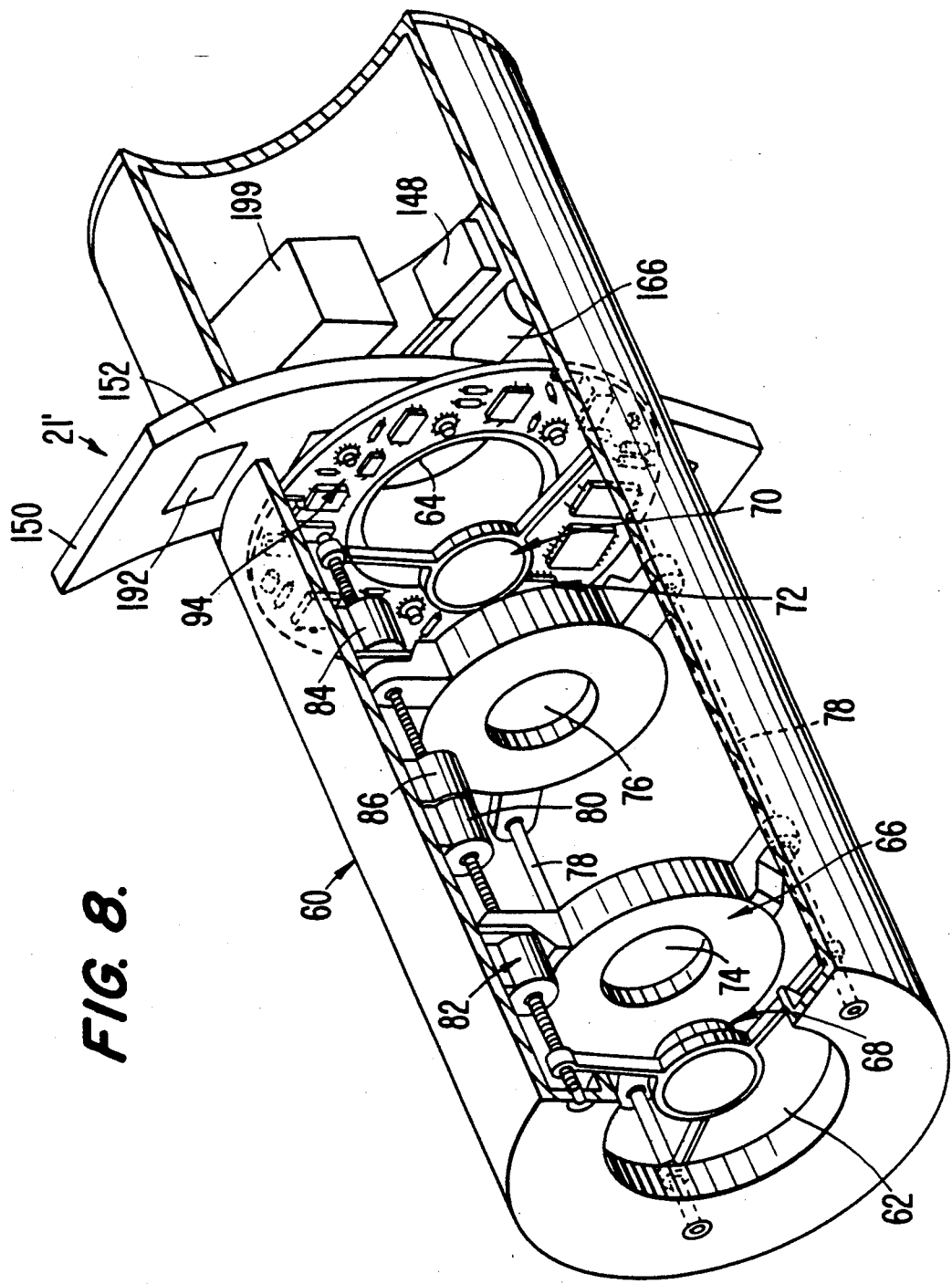
FIG. 8 is a partially cutaway perspective view of a preferred embodiment of an image forming and detecting device of the invention.

In a preferred embodiment depicted in FIG. 8, the multispectral band imaging and detecting device comprises casing 60 having an optical axis extending between inlet opening 62 and outlet opening 64. A plurality of axially-spaced reflective surfaces 66, 68, 70 and 72 are coaxially disposed in casing 60 for receiving object energy through inlet opening 62 and for reflecting electromagnetic energy emanating from the object through outlet opening 64 to form a real image. The object energy, which may be in the ultraviolet through infrared range, is reflected by the reflective surfaces in a manner similar to that depicted in FIG. 3. The object energy is received by first reflective surface 66 and reflected to second reflective surface 68. This surface is chosen to reflect convergent or substantially parallel rays through openings 74, 76 centrally located in first and fourth reflective surfaces 66, 72 to third reflective surface 70. Third reflective surface 70 transforms the near parallel rays into diverging rays which are reflected from fourth reflective surface 72 to form a real image on detector means 21'.

In accordance with the invention the device includes an optical bench having a face moveable transverse to the axially-spaced reflective surfaces. In the embodiment of FIG. 8 an optical bench 150 is provided that has an arcuate face 152 that is moveable transverse to the axially-spaced reflective surfaces.

Also in accordance with the invention, the device includes a plurality of spaced electromagnetic radiation detectors mounted on the face of the optical bench. As shown in the embodiment of FIG. 8 the optical bench 150 has a plurality of detectors, for example, detector 142, mounted on arcuate surface 152. Detector means 21' comprises optical bench 150 and the detector such as detector 142.

Figure 9:
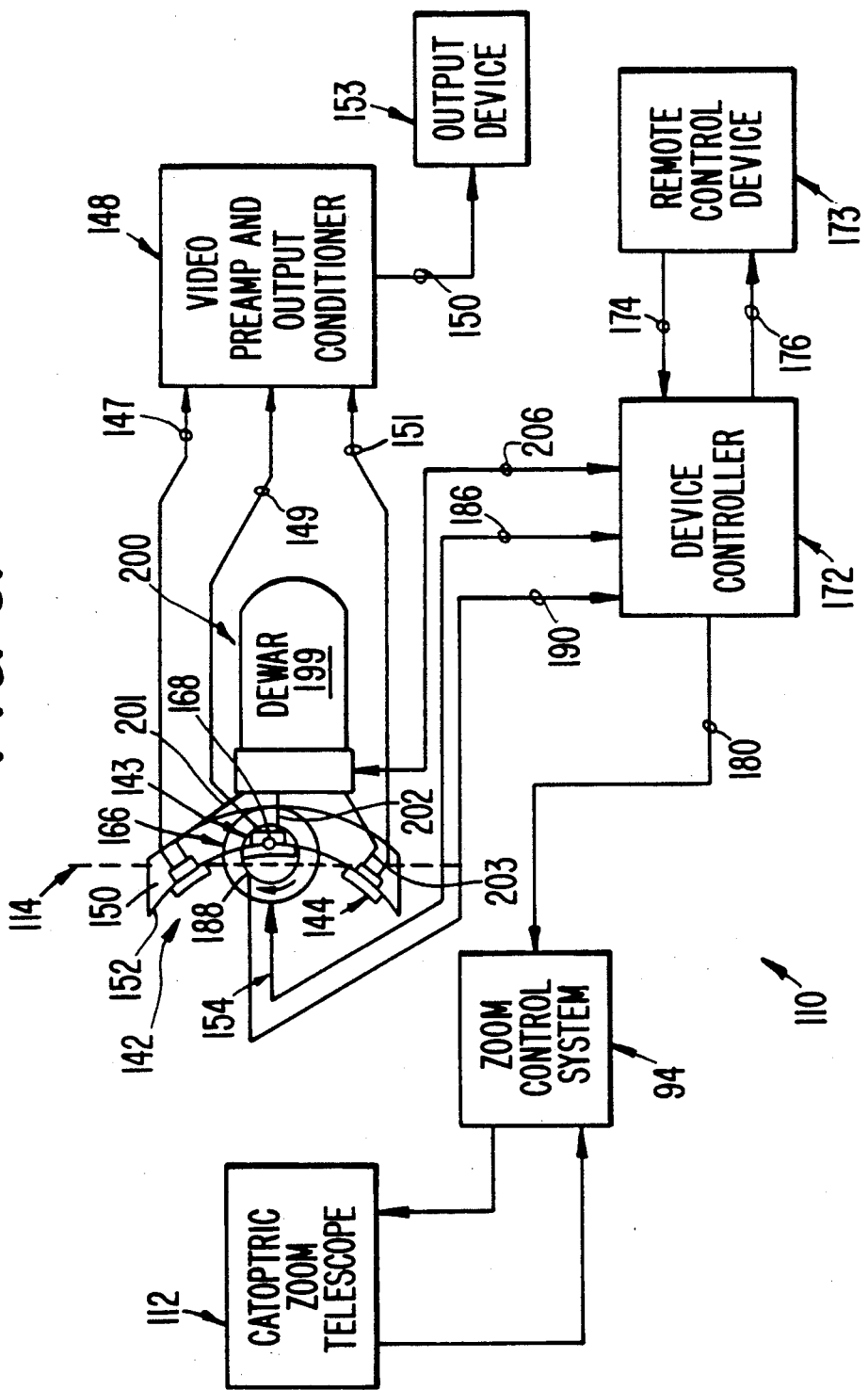
FIG. 9 is a schematic block diagram of the embodiment of FIG. 8.
Figure 10:
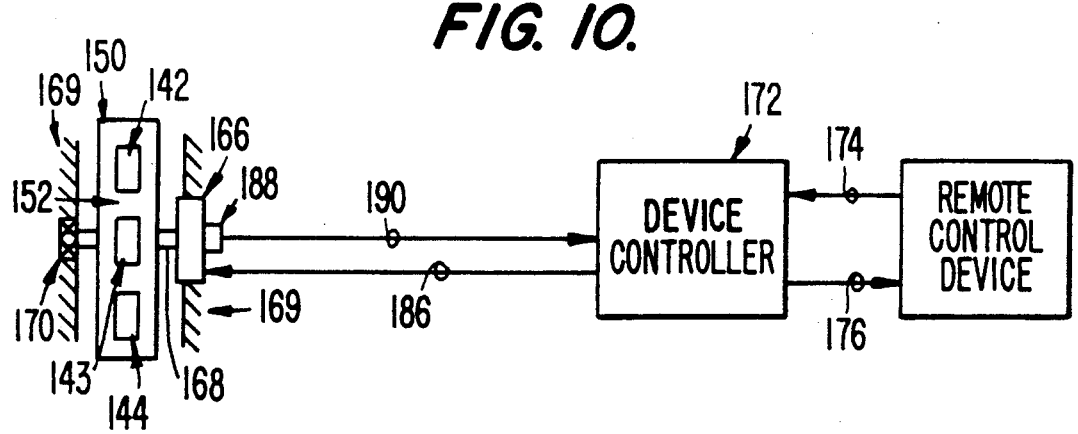
FIG. 10 is a schematic block diagram of a front view of an embodiment of the detectors and moving means shown in FIGS. 8 and 9.

Each of the optical bench and detectors described in reference to FIG. 8 is more fully described in reference to FIGS. 9 and 10.

FIG. 9 is a schematic block diagram of the device of FIG. 8. As shown in FIG. 9, a catoptric zoom telescope 112 is provided. Catoptric zoom telescope 112 provides an image of the scene being viewed at a focal plane 114. It should be understood that to accomplish the objects of the present invention, it is not essential that a catoptric zoom telescope, shown in block form in FIG. 9 and schematically in FIG. 8, be employed. It is only essential that an optical system effective over the desired wavelength range be employed that forms an image of a scene being viewed at focal plane 114. Further, while the optical bench, detectors and moving means of FIGS. 9 and 10 are shown in combination with the catoptric zoom telescope of FIG. 8, it should be understood that in applications of the present invention where a catoptric zoom telescope is employed, any of the catoptric zoom telescopes shown in FIGS. 1-7, and described in reference thereto, may find application as the catoptric zoom telescope 112 of FIG. 9.

Figure 10A:
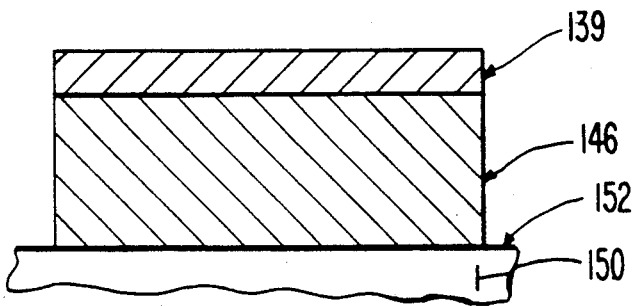
FIG. 10A is a side sectional view of one of the detectors shown in FIG. 10 including filter means disposed on its sensitive surface.

Arcuate surface 152 has an axis of rotation 154 associated therewith. Detectors 142, 143 and 144 are disposed on arcuate surface 152 of arcuate section 150 along the circumference of a circle that intersects arcuate surface 152 and that is perpendicular to axis of rotation 154. While three detectors 142, 143 and 144 are shown in FIG. 9, the present invention is not limited to any specific number of detectors. The detectors in accordance with the present invention may all be sensitive to a single portion of the electromagnetic radiation spectrum or may be each sensitive to different portions of the spectrum. Additionally, the detectors may be broadband detectors, sensitive to a large part of the electromagnetic spectrum, having filter means disposed between the source of radiation and the detector. The filter means block all radiation except for that portion of the electromagnetic spectrum to be examined. For example, as shown in FIG. 10A, detector 144 is embodied as a broad-band detector having a narrow-band filter 139 disposed on its surface. Alternatively, filter 139 may be disposed remote from detector 146, provided that filter 139 is disposed between the source of radiation and detector 146.

The signals generated by detectors 142, 143 and 144 in response to radiation falling incident on them are communicated, as represented by lines 147, 149 and 151, respectively, to a video preamp and output conditioner 143. Video preamp and output conditioner 148 amplifies the signals received from sensors 142, 143 and 144 and conditions them for output. The conditioned signals are communicated, as represented by a line 150, to an output device 153, such as, for example, a video-display terminal or a recorder.

Figure 11:
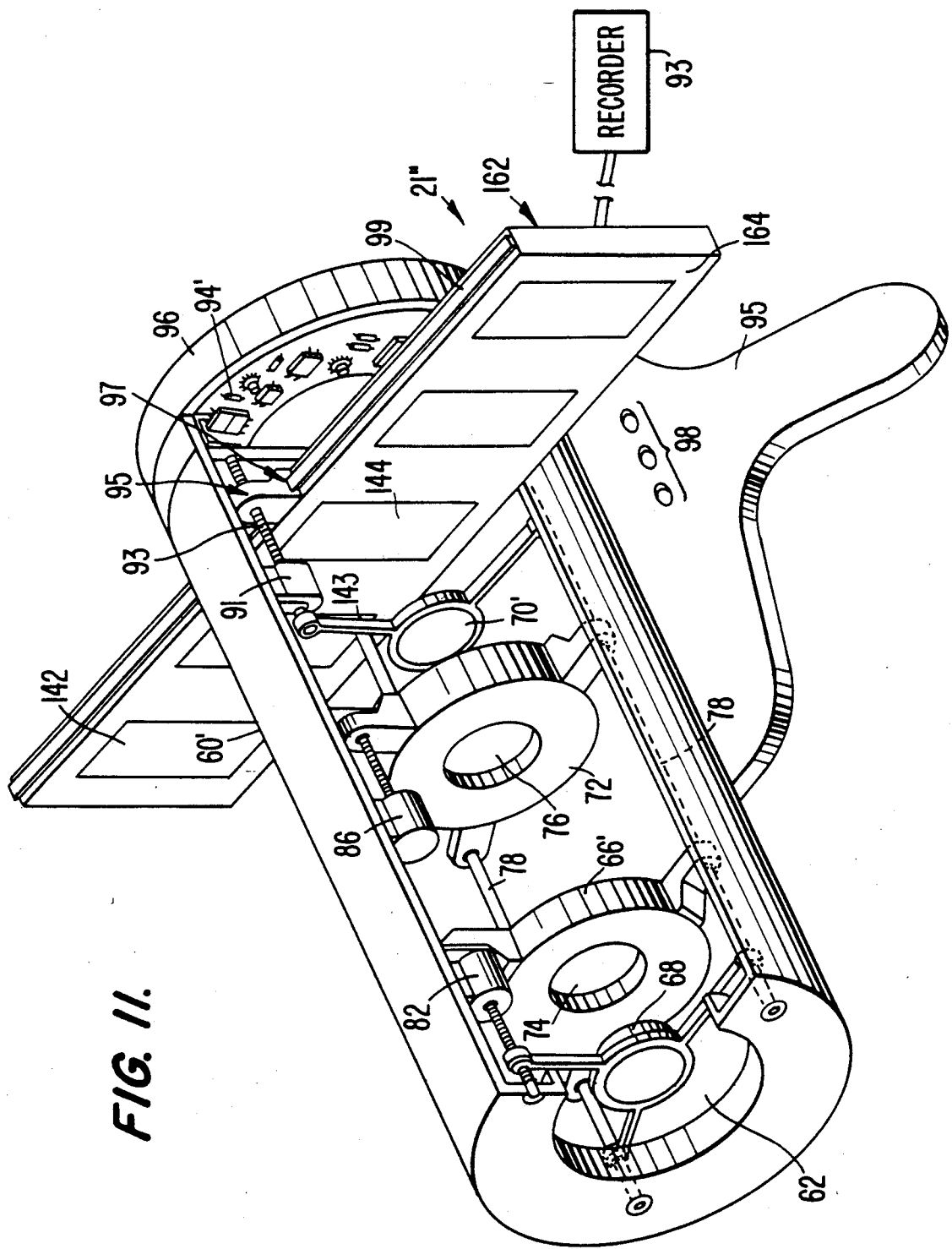
FIG. 11 is a partially cutaway perspective view of a second embodiment of an image forming and detecting device of the invention.

A second preferred embodiment of the present invention is depicted in FIG. 11, wherein elements common to FIG. 8 have the same numbers. Detector means 21" of FIG. 11 includes optical bench 162, shown in greater detail in FIGS. 12A and 12B. A rectangular member 162 is provided that has a substantially flat surface 164. The detectors, such as the one indicated by the numeral 142, are disposed on surface 164 of rectangular member 162 in a linear formation along a line 165. Rectangular member 162 is moveable transverse relative to the reflector set means Rectangular member 162 includes a dovetail rail 99 on its top edge that is slidably constrained by a dovetail notch 97 in chuck 95. The combination of dovetail notch 97 and dovetail rail 99 guides rectangular member 162 as it moves transversely relative to the reflector set. The means to effect such a transverse motion is discussed below in reference to the moving means of FIGS. 12A and 12B. The signals generated by the detectors 142-146 are processed in the manner described in reference to the apparatus of FIGS. 8, 9 and 10.

Figure 13A:
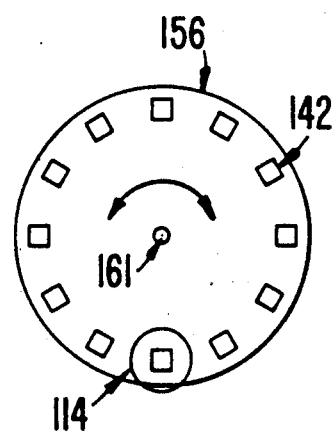
FIG. 13A is a front view of a third embodiment of a detector array in accordance with the present invention.
Figure 13B:
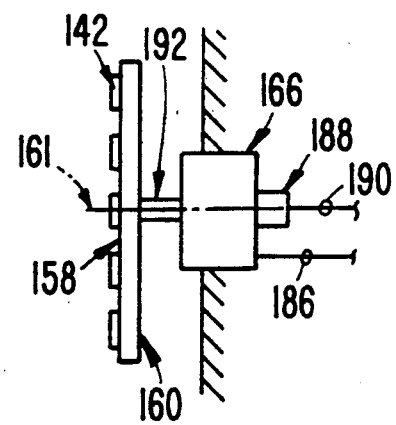
FIG. 13B is a side view of the detectors and moving means of the embodiment of FIG. 13A.

A third embodiment of the optical bench in accordance with the present invention is shown in FIGS. 13A and 13B. A circular section 156 is provided that has a first surface 158 and a second surface 160 and a center or axis of rotation 161. The detectors, such as the one indicated by the numeral 142, are disposed on first surface 150 of circular member 156 in a circular formation that is substantially concentric with the center or axis of rotation 161. The signals generated by detectors 142, 143 and 144 are processed in the manner described in reference to FIGS. 8, 9 and 10.

Figure 14A:
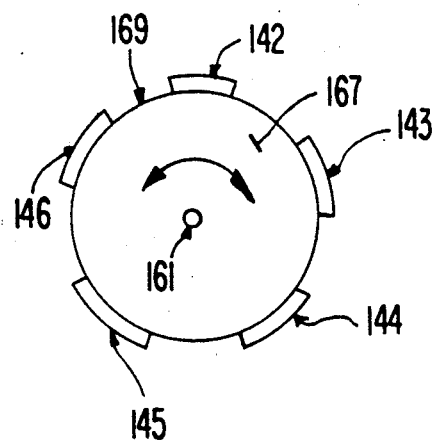
FIG. 14A is a front view of a fourth embodiment of a detector array in accordance with the present invention.
Figure 14B:
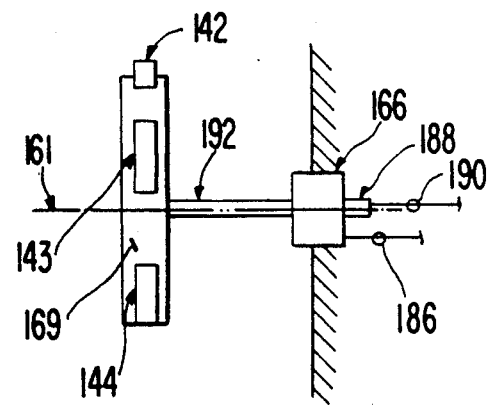
FIG. 14B is a side view of the detectors and moving means of the embodiment of FIG. 14A.

A fourth embodiment of the optical bench in accordance with the present invention is shown in FIGS. 14A and 14B. A cylindrical section 167 is provided that has a cylindrical surface 169 and an axis of rotation 161. The detectors, such as the one indicated by the numeral 142, are disposed on cylindrical surface 169 of cylindrical member 167 in a formation that is substantially concentric about axis of rotation 161. The signals generated by detectors 142, 143, 144 and 145 are processed in the manner described in reference to FIGS. 8, 9 and 10.

Also in accordance with the present invention, the device includes means for moving the optical bench for positioning a selected one of the detectors in axial alignment with the reflector set means. As embodied herein, and as shown in FIGS. 8, 9 and 10, a first embodiment of the moving means includes a motor 166 that is connected to arcuate section 150 through a shaft means 168. Motor 166 is, for example, a torque or stepping motor that is capable of taking small and accurate incremental steps. Shaft means 168 is supported on one end thereof by motor 166 and at the other end thereof by a bearing 170. Motor 166 and bearing 170 are, in turn, supported by a support structure 169 of device 110. When motor 166 is actuated, shaft 168 turns causing arcuate section 150 to similarily turn. The moving means is so designed and constructed that as arcuate section 150 turns arcuate surface 152 rotates about its axis of rotation 154. Thus, as shown in FIG. 9, detector 143 is disposed on the focal plane 114. For example, as motor 166 rotates clockwise, as shown by the arrow, the arcuate section also rotates clockwise to bring detector 142 into coincidence with the focal plane 114 as sensor 143 is rotated out of the focal plane 114.

A controller for the multispectral band imaging and detecting device, hereinafter a device controller 172, is provided that receives commands from a remote control device 173, as indicated by input line 174. Information from the device controller concerning the relative positions of the elements in both device 110 and telescope 112 is communicated, as depicted by output line 176, to remote control device 173. Communication links as represented by input and output lines, 174 and 176, respectively, may be hard wire or an optical fiber link, for example.

Device controller 172 sends position change signals to motor 166, as represented by line 186, and receives position feedback signals generated by a rotational position measurement device 188, as represented by line 190. As is well known, a torque motor will move upon command to a desired position by virtue of the control system providing position feedback information to the torque motor. On the other hand, a stepping motor will reach a desired position and remain at that position without feedback being required. Accordingly, where motor 166 is embodied as a torque motor, a position feedback signal needs to be provided to motor 166.

The user of the system selects via remote control device 173 the spectral band to be viewed by choosing one of the available detectors 142, 143 and 144, the spectral response of which is known. Device controller 172 sends the necessary commands to motor 166 to move the chosen detector into alignment with focal plane 114. Each of detectors 142, 143 and 144 has associated therewith a unique signal value generated by rotational position measurement device 188. Thus, the signal from rotational measurement device 188 sent to device controller 172 indicates which of the detectors is in focal plane 114. If the desired detector is in the focal plane, no further movement of the arcuate section 150 is necessary. If, however, the desired detector is not in the focal plane 114, device controller 172 energizes motor 166 to cause motor 166 and, hence, arcuate section 150 to rotate until the signal from rotational position measurement device 188 is received by device controller 172 at which point motor 166 is de-energized. It is further recognized that deliberate misfocusing to achieve some desired result is also considered to be within the scope of the present invention. Such misfocusing can be achieved by setting the position of the detector off the focal plane 114. Alternatively, misfocusing can be achieved by adjusting telescope 112 to move focal plane 114 relative to the detector.

Figure 12B:
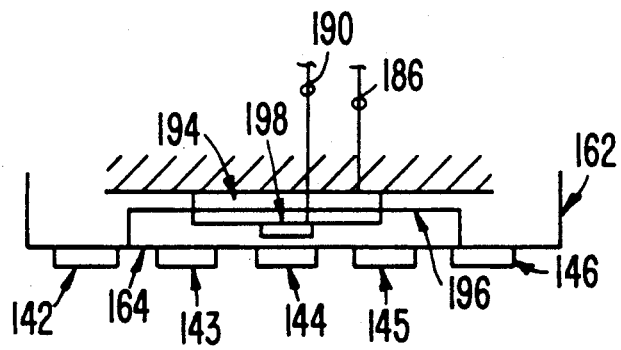
FIG. 12B is a top view of the detectors and moving means of the embodiment of FIG. 11.
Figure 12A:
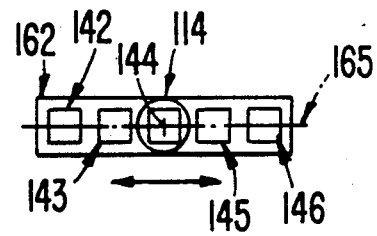
FIG. 12A is a front view of the detectors of the embodiment of FIG. 11.

A second embodiment of the moving means in accordance with the present invention is as shown in FIGS. 12A and 12B. A linear actuator 194 is provided that is connected through drive means 96 to the rectangular member 162. Linear actuator 194 is actuated in response to a signal from device controller 172, not shown in FIG. 12. When actuated, linear actuator 194 causes drive arms 196 to move in a desired direction which, in turn, causes rectangular member 162 to move. The position of the linear actuator is monitored by linear position monitor 198, such as, for example, a linear potentiometer. The position information is fed back to device controller 172, as represented by line 190. In this way, a desired linear movement can be accomplished as illustrated by the double-headed arrow to move the sensors, such as detector 142, into or out of focal plane 114. Each of the detectors has an associated unique value generated by linear position monitor 198. Device controller 172, therefore, can sense whether the desired detector is in focal plane 114 or not. If it is not, device controller 172 energizes linear actuator 194 to cause rectangular member 162 to move linearly until the desired detector is in focal plane 114.

A third embodiment of the moving means in accordance with the present invention is shown in FIGS. 13 and 13A. Motor 166 is caused to rotate in response to a signal thereto from device controller 172, not shown in FIG. 13. Motor 166 is connected through shaft 192 to circular section 156. Thus, rotation of motor 166 causes a concomitant rotation of circular section 156 in the direction indicated by the arrow. The position of motor 166, and hence, of circular section 156 is detected by rotational position measurement device 188 and transmitted to device controller 172 over line 190. Rotation of circular section 156 causes the detectors such as, for example, detector 142, to rotate into and out of focal plane 114. As described in reference to FIGS. 9 and 10, the detectors disposed on circular section 156 have associated with each of them a unique value generated by rotational position measurement device 188. Device controller 172, therefore, can sense whether the desired detector is in focal plane 114 or not. If it is not, device controller 172 energizes motor 166 to cause circular section 156 to rotate until the desired detector is in focal plane 114.

A fourth embodiment of the moving means in accordance with the present invention is shown in FIGS. 14A and 14B. Motor 166 is caused to rotate in response to a signal thereto from device controller 172, not shown in FIG. 14. Motor 166 is connected through shaft 192 to cylindrical section 167. Thus, rotation of motor 166 causes a concomitant rotation of cylindrical section 167 in the direction indicated by the arrow. The position of motor 166, and hence, of cylindrical section 167 is detected by rotational position measurement device 188 and transmitted to device controller 172 over line 190. Rotation of cylindrical section 167 causes the detectors such as, for example, detector 142, to rotate into and out of focal plane 114. As described in reference to FIGS. 9 and 10, the detectors disposed on cylindrical section 167 have associated with each of them a unique value generated by rotational position measurement device 188. Device controller 172, therefore, can sense whether the desired detector is in focal plane 114 or not. If it is not, device controller 172 energizes torque motor 166 to cause cylindrical section 167 to rotate until the desired detector is in focal plane 114.

Also in accordance with the present invention, the device includes focusing means for selectively varying the axial distance between the reflective set means and the selected one of the detectors. In the embodiment of FIG. 8, the detector means is axially fixed and the focusing means comprises means for axially moving the reflector set relative to outlet opening 64 and detector 90. Drive motors 80, 82, 84 and 86 when operated simultaneously will axially move reflector surfaces 66, 68, 70 and 72 as a set with variable or fixed relative spacing, thereby serving to focus the magnified image on the detector means.

Alternatively, the multispectral band imaging and detecting device of the invention may include a movable detector and may provide axial movement of only some of the reflectors of the set. Such an embodiment is depicted in FIG. 11. In this embodiment, reflectors 68 and 72 are movably mounted in casing 60 in the same way as depicted in FIG. 8. Reflectors 66' and 70', however, are axially fixed in casing 60. The focal length of the reflector set is adjusted for selective magnification by axial movement of reflectors 68 and 72. Detector means 21" is mounted in casing 60 in a manner similar to reflectors 68 and 72 thus permitting selective axial movement of detector means 21" by means of a motor 91 to focus the magnified image. Motor 91 is operable to turn screw shaft 93. Screw shaft 93 is in threaded engagement with a chuck 95 such that when motor 91 operates to rotate screw shaft 93, chuck 95 moves axially relative to screw shaft 93. In this way, detector means 21" can be moved in or out of the image formed by the reflector set. Detector means 21" may be of a type which electrically transmits the detected image to a recorder 93. This arrangement permits manual aiming of the device by means of handle 95 without manual movement of a cumbersome recorder.

FIGS. 8 and 11 are illustrative of only two combinations of reflector sets and detector means in accordance with the present invention. It should be understood, therefore, that any of the detector means, illustrated in FIGS. 9, 10, 12A, 12B, 13A, 13B, 14A and 14B may be employed in any of the reflector sets illustrated in FIGS. 1–8 and 11 to accomplish the purposes of the present invention.

Preferably, the reflector set of the multispectral band imaging and detecting device also includes means for controlling the magnifying and focusing means. Such controlling means should include means responsive to a selected level of magnification for determining the necessary relative axial spacing between the reflective surfaces in the reflector set to obtain the desired magnification and the necessary axial spacing between the reflector set and the detector to focus the magnified image. In the embodiment depicted in FIG. 8, the magnification and focusing means include microprocessor means 94 for controlling the axial position of the reflective surfaces to obtain a desired focused magnification. Similar microprocessor means 94' is used in the embodiment of FIG. 11 to control reflector and detector positions.

In the embodiment of FIG. 8, reflective surfaces 66, 68, 70 and 72 comprise a reflector set. Each reflective surface is supported in casing 60 for axial movement by guide rods 78. To vary the relative axial spacing between the reflective surfaces, means are provided in the casing for axially moving the surfaces. As depicted in FIG. 8, the moving means comprise reversible drive motors 80, 82, 84 and 86 operatively connected to reflective surfaces 66, 68, 70 and 72, respectively. Each drive motor is fixed inside casing 60 and includes a threaded drive shaft engaging cooperative threaded bores associated with each reflective surface such that rotation of the drive motor axially moves the reflective surface.

Each reflective surface may include a linear potentiometer in communication with the microprocessor to sense and communicate the axial position of the reflective surface. The potentiometer may be incorporated with the drive motor 80, 82, 84 and 86 as in FIG. 8 or may be incorporated in casing 60 in any number of known ways to provide an electrical signal to the microprocessor.

The drive motors and microprocessor of the devices depicted in FIGS. 8 and 11 are powered by battery 96.

The devices depicted in FIGS. 8 and 11 may include control buttons for selecting the desired zoom magnification and for focusing the magnified image on the detector. In FIG. 11, three manually operable buttons 98 connected to the microprocessor means are disposed on handle 95 in FIG. 11.

Figure 15:
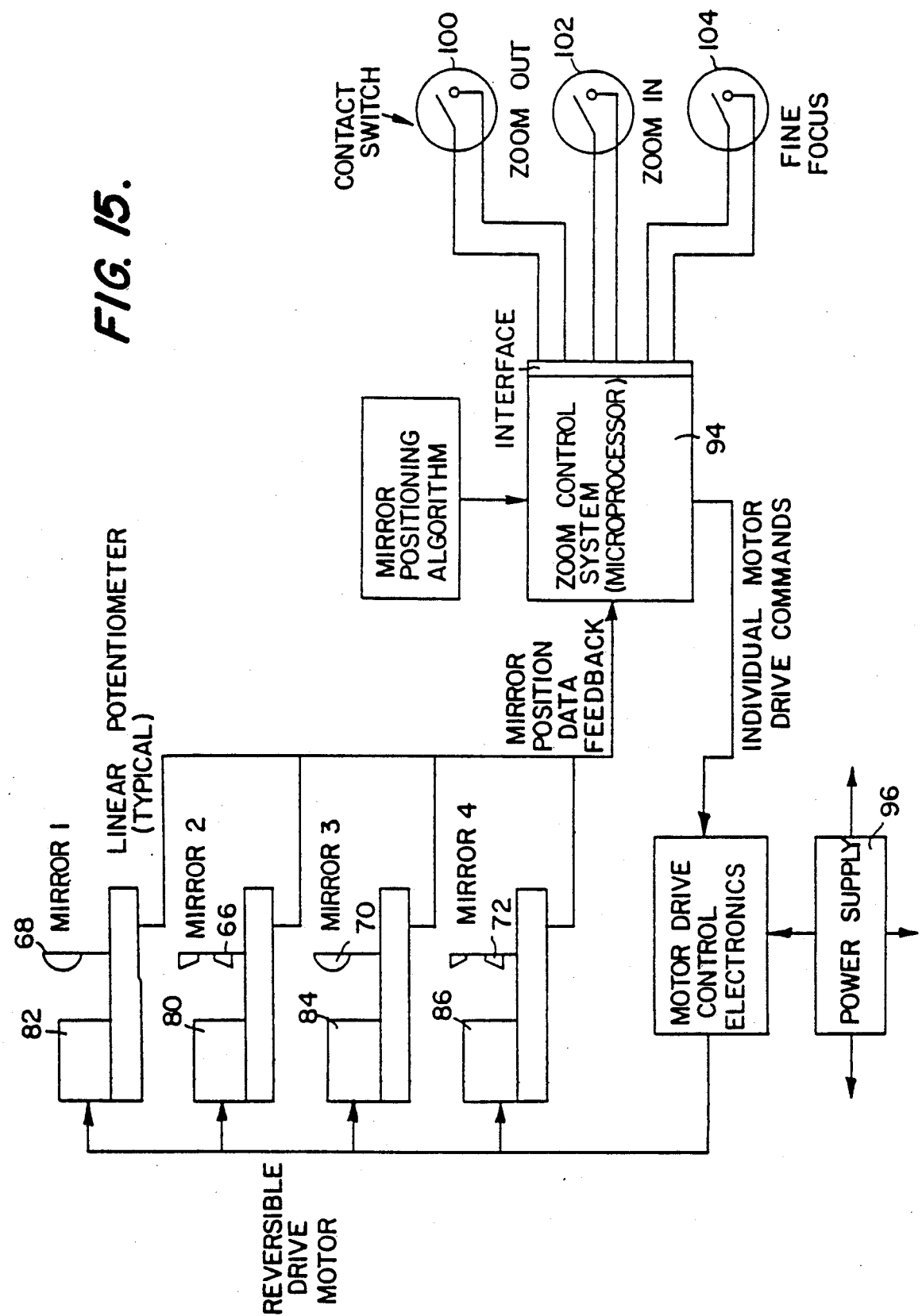
FIG. 15 is a diagrammatic representation of the control circuitry for the reflector set of the embodiment depicted in FIG. 8.

The characteristics of the control means for the reflector set of the embodiment of FIG. 8 are functionally depicted by the block diagram in FIG. 15. The three manual buttons, such as, for example, 98 shown in FIG. 11, are represented by switches 100, 102 and 104. Switches 100 and 102 are electrically connected to microprocessor 94 to communicate the desired magnification of the object's image and the microprocessor generates individual motor drive commands to axially move associated reflective surfaces to obtain the required focal length for the reflector set. Once the desired image magnification is obtained, switch 104 may be activated to simultaneously move all reflective surfaces in fixed relative relation to focus the magnified image on the detector. Means for manually selecting the desired mangification, such as switches 100 and 102, are depicted, it should be understood, however, that other automatic or electrical means may be substituted. Similarly, the focusing aspect may be manually controlled or may be accomplished through electronic means.

Microprocessor 94 functions in response to an algorithm by which the axial position of each reflective surface is determined. Using the formulas discussed above and other known relationships between reflective surfaces, one skilled in the art would be able to develop an algorithm which defines the required axial position of each reflective surface to effect zooming magnification and focusing of the magnified image on the fixed detector. Similarly, algorithms may be incorporated in microprocessor 94' for determining axial positions of reflective surfaces and movable detector means 21 in the embodiment of FIG. 11. The hardware and software of the microprocessors 94, 94' are within the skill of one skilled in the art.

For some detector arrays it is necessary to provide cooling. In accordance with a preferred embodiment of the present invention, cooling means are provided to cool the detector arrays. As embodied herein the cooling system is shown in FIGS. 9 and 16.

A "dewar" flask 200 is provided. Typically, a dewar flask is a container (cryostat) for holding detector coolant and consists of an inner flask and an outer flask. For the purposes of illustration, however, dewar 200 of FIGS. 8, 9 and 16 is shown as comprising a single flask 199. The sensor arrays to be cooled are mounted in thermal contact with flask 199, which contains the coolant. The sensors, therefore, operate at the cryogenic temperature. In the present embodiment, coolant from the flask 199, of dewar 200 passes along cooling lines 201, 202 and 203 to sensors 142, 143 and 144, respectively.

Referring to FIG. 16, a cooling controller 204 receives a signal via communication means, represented by line 206, from device controller 172, not shown in FIG. 16, that radiation is incident on a detector requiring cooling. Such a signal is generated, for example, when a detector requiring cooling is brought into coincidence with focal plane 114. A power pulse of the correct magnitude and duration is sent via communication means, as represented by line 209, to a squib 210 to fire squib 210. Squib 210 is a pyrotechnic device that fires in response to the signal sent thereto and drives a pin 212 through a membrane 213 into dewar flask 199. The pressurized gasses in flask 199 pass through a pressure regulator 214 and a coolant flow regulator 216. Coolant flow regulator 216, in response to a signal from cooler controller 204 via communication means, as represented by a line 218, controls the flow of gas to an expansion cooler 220. The position of coolant flow regulator 216 feeds back via communication means, as represented by line 222, to cooler controller 204. The coolant itself is carried by a conduit 221 from coolant flow regulator 216 to expansion cooler 220. Conduit 221 is of a conventional type and provides a flexible connection between coolant flow regulator 216 and expansion cooler 220 to allow relative movement between detector 142 and dewar 200.

A temperature monitoring device 224 measures the temperature at the base of detector 142 and provides this information via communication means, as represented by line 226, to cooler controller 204. More or less coolant is permitted to pass into expansion cooler 220 to maintain the desired temperature at the base of sensor 142.

Although FIG. 16 shows only a single cooler, it should be understood that any number of similar coolers can be provided to correspond to the number of detectors employed. Further, while FIG. 9 illustrates a cooler used in conjunction with an optical bench embodied as an arcuate section it should be understood that the cooler can be used in conjunction with the linear section of FIGS. 12A and 12B, the circular section of FIGS. 13A and 13B or the cylindrical section of FIGS. 14A and 14B. Further still, the dewar 200 of FIG. 15 may be fixed relative to the detector such as, for example, by fixing it to expansion cooler 220 thus obviating the need for flexible conduit 221.

It will be apparent to those skilled in the art that various modifications and variations can be made in the multispectral band imaging and detecting device with common optics of the present invention without departing from the scope or spirit of the invention. Thus, it is intended that the present invention cover the modifications and variations of this invention provided they come within the scope of the appended claims and their equivalents.

What is claimed is:

1. A catoptric optical device comprising:
   reflector set means for transforming received object energy into a real image of /said object, said set means having a variable focal length and including a plurality of axially-spaced reflector means for coaxially receiving and reflecting said energy;
   magnifying means for selectively varying the focal length of said reflector set means;
   a plurality of spaced electromagnetic radiation detectors;
   means for mounting said plurality of detectors in a predetermined spaced array;
   means for moving said mounting means to selectively position a selected one of said detectors in alignment with the image generated by said reflector set means; and
   focusing means for selectively varying the axial distance between said reflector set means and said selected one of said detectors.

2. The catoptric device of claim 1 wherein said magnifying means comprises means for selectively varying the relative axial spacing between said reflector means.

3. The catoptric device of claim 1 wherein said focusing means comprises means for axially moving said reflector set means relative to said selected detector.

4. The catoptric device of claim 1 wherein said focusing means comprises means for axially moving said mounting means relative to said reflector set means.

5. The catoptric device of claim 1 also including means operatively connected to said magnifying means and to said focusing means for selectively controlling the axial position of each said reflector means.

6. The catoptric device of claim 5 wherein said controlling means comprises power means operatively supporting each said reflector means for axially moving said reflector means relative to each other and to said selected detector, microprocessor means operatively connected to said power means for directing axial movement of said reflector means to generate a focused image at said selected detector of desired magnification, and means in communication with said microprocessor means for sensing the axial position of each said reflector means.

7. A catoptric optical device comprising:
   a casing having an optical axis;
   a plurality of axially-spaced reflective surfaces coaxially disposed in said casing for receiving object energy and for forming a real image of said object;
   means in said casing for axially moving each said reflective surface;
   means controlling said moving means for selectively changing the axial spacing between said reflective surfaces to generate selectively variable magnification of said image;

an optical bench having a face moveable transverse to said axially-spaced reflective surfaces;

a plurality of spaced electromagnetic radiation detectors mounted on said face of said optical bench;

means for moving said optical bench for positioning a selected one of said detectors in axial alignment with said plurality of axially-spaced reflective surfaces; and means controlling said moving means for selectively axially displacing said reflective surfaces in fixed relative relation to focus said image in a focal plane.

8. The catoptric device of claim 7 also including means for axially moving said optical bench relative to said plurality of axially-spaced reflective surfaces to selectively move the selected one of said detectors relative to the real image of said object.

9. The catoptric device of claim 8 also including means in said casing for guidably supporting each said reflective surface for axial movement.

10. The catoptric device of claim 9 wherein said moving means for each said reflective surface includes a reversible motor means fixed in said casing and drivingly engaging said reflective surface for axially moving said reflective surface along said supporting means.

11. The catoptric device of claim 10 wherein said motor means includes means for sensing and for communicating to said changing means and said displacing means the axial position in said casing of its respective reflective surface.

12. The catoptric device of claim 11 wherein said changing means and said displacing means comprise microprocessor means disposed in said casing.

13. The catoptric device of claim 12 also including means in communication with said microprocessor means for actuating said changing means and said displacing means.

14. The catoptric device of any one of claims 7-13 wherein first, second, third and fourth reflective surfaces are disposed in said casing, said first surface being disposed for receiving said object energy and reflecting said energy to said second surface, said second surface being disposed to reflect said energy through central openings in said first and fourth surfaces to said third surface, said third surface being disposed to reflect said energy to said fourth surface axially disposed between said first and third surfaces, and said fourth surface being disposed to reflect radiation to form an image on said selected detector.

15. A multispectral band imaging and detecting device comprising:

an all-reflector optical system including a plurality of relatively movable reflectors for forming on a focal plane an image of a scene being viewed;

a plurality of electromagnetic radiation detectors, each sensitive to one or more portions of the electromagnetic spectrum;

an optical bench in adjustable spaced relation to the optical system, said plurality of electromagnetic radiation detectors being disposed on said optical bench; and means for moving said optical bench relative to the image of the scene on a focal plane to bring a selected one of said plurality of electromagnetic detectors into coincidence with the image formed by the optical system.

16. The multispectral band device as in claim 15 further including means for cooling each of said plurality of electromagnetic radiation detectors.

17. The multispectral band device as in claim 15 wherein said optical bench is substantially arcuate in shape and has an interior surface having a center of curvature, said plurality of electromagnetic radiation detectors being disposed on said interior surface in spaced relation equidistant from said center of curvature.

18. The multispectral band device as in claim 15 wherein said optical bench is circular in shape having first and second opposed surfaces and an axis of rotation, said plurality of electromagnetic radiation detectors being disposed on said first surface in spaced relation equidistant from the axis of rotation.

19. The multispectral band device as in claim 15 wherein said optical bench is of a rectangular shape having first and second opposed surfaces, said plurality of electromagnetic radiation detectors being disposed on said first surface in a spaced relation along a line parallel to the direction of relative movement of the image and said optical bench.

20. The multispectral band device as in claim 17 wherein said moving means comprises:

a motor operatively connected to said optical bench to rotate said optical bench about its center of curvature; and a device controller for actuating said motor.

21. The multispectral band device as in claim 18 wherein said moving means comprises:

a motor operatively connected to said optical bench to rotate said optical bench about its axis of rotation; and a device controller for actuating said alignment torque motor.

22. The multispectral band device as in claim 19 wherein said moving means comprises:

a linear actuator operatively connected to the second surface of the optical bench to linearly reciprocate said optical bench; and a device controller for actuating said linear actuator in response to a signal thereto.

23. A multispectral band imaging and detecting device with common optics, comprising:

reflector set means for forming at a focal plane a real image of a scene being viewed, said reflector set means having a variable focal length and including a plurality of axially-spaced reflector means for coaxially receiving and reflecting electromagnetic radiation from the scene being viewed;

magnifying means for selectively varying the focal length of said reflector set means;

focusing means for selectively varying the axial distance between said reflector set means and said focal plane;

a plurality of electromagnetic radiation detectors sensitive to one or more portions of the electromagnetic spectrum;

an optical bench in adjustable spaced relation to the reflector set means, said plurality of electromagnetic radiation detectors being disposed on said optical bench; and means for moving said optical bench to bring a selected one of said plurality of electromagnetic detectors in coincidence with the focal plane.

24. A multispectral band imaging and detecting device with common optics, comprising:

a casing having an optical axis;

a plurality of axially-spaced reflective surfaces coaxially disposed in said casing for receiving electromagnetic radiation from a scene being viewed and for reflecting electromagnetic radiation to form a real image of the scene being viewed at a focal plane;

means in said casing for axially moving each of said reflective surfaces;

means controlling said moving means for selectively changing the axial spacing between said reflective surfaces to generate selectively variable magnification of said real image;

means controlling said moving means for selectively axially displacing said reflective surfaces in fixed relative relation to focus the real image;

a plurality of electromagnetic radiation detectors sensitive to one or more portions of the electromagnetic spectrum;

an optical bench in adjustable spaced relation to the real image formed by said plurality of axially-spaced reflective surfaces, said plurality of electromagnetic radiation detectors being disposed on said optical bench; and means for moving said optical bench relative to the real image to bring a selected one of said detectors into coincidence with the real image.

* * * * *